United States Patent
Bartolucci et al.

(10) Patent No.: US 11,027,910 B2
(45) Date of Patent: Jun. 8, 2021

(54) PISTON WITH FLEXIBLE CLOSURE FOR AEROSOL CONTAINER

(71) Applicant: The Procter & Gamble Company, Cincinnati, OH (US)

(72) Inventors: Stefano Bartolucci, Singapore (SG); Andrew William Franckhauser, Batavia, OH (US); William Mercer Benson, Harrison, OH (US); Nathan Daniel Grubbs, West Chester, OH (US)

(73) Assignee: The Procter and Gamble Company, Cincinnati, OH (US)

(*) Notice: Subject to any disclaimer, the term of this patent is extended or adjusted under 35 U.S.C. 154(b) by 0 days.

(21) Appl. No.: 16/194,502

(22) Filed: Nov. 19, 2018

(65) Prior Publication Data
US 2019/0152684 A1 May 23, 2019

(30) Foreign Application Priority Data
Nov. 23, 2017 (EP) .................................... 17203315

(51) Int. Cl.
*B65D 83/64* (2006.01)
*F16J 1/01* (2006.01)
(Continued)

(52) U.S. Cl.
CPC .............. *B65D 83/64* (2013.01); *B65D 83/42* (2013.01); *F16J 1/003* (2013.01); *F16J 1/01* (2013.01); *B65D 83/0005* (2013.01)

(58) Field of Classification Search
CPC .... B65D 83/64; B65D 83/42; B65D 83/0005; B65D 83/0072; F16J 1/003; F16J 1/01
(Continued)

(56) References Cited

U.S. PATENT DOCUMENTS 2,430,718 A * 11/1947 Jacobson ........... B65D 83/0005
222/386
3,104,785 A 9/1963 Knapp
(Continued)

FOREIGN PATENT DOCUMENTS

DE 3147004 A1 5/1983
DE 19937554 A1 3/2001
(Continued)

OTHER PUBLICATIONS

All final and non-final office actions for U.S. Appl. No. 15/926,075.
(Continued)

*Primary Examiner* — Lien M Ngo
(74) *Attorney, Agent, or Firm* — Linda M. Sivik (57) ABSTRACT

The invention relates to a piston for an optionally pressurized container, the piston having a sidewall, an upper side and a bottom side, and at least a first circumferential seal, wherein at least the upper side of the piston is closed by a closure and made of a first elastic material, wherein the upper side is configured to deform upon a pressure change acting on the upper side, wherein the sidewall is made of a second material which is different from the first elastic material, wherein the first circumferential seal is positioned on the sidewall on its outer surface. The invention further relates to an optionally pressurized container comprising a piston as mentioned above, to a process of discharging a product from said container and to a process of manufacturing said container.

14 Claims, 4 Drawing Sheets

(51) Int. Cl.
 *F16J 1/00* (2006.01)
 *B65D 83/42* (2006.01)
 *B65D 83/00* (2006.01)

(58) Field of Classification Search
 USPC .......... 222/386, 389, 402.1, 402.22–404.25, 222/386.5, 399, 394, 401, 402
 See application file for complete search history.

(56) References Cited

U.S. PATENT DOCUMENTS

| | | | |
|---|---|---|---|
| 3,235,135 | A | 2/1966 | Henri |
| 3,247,640 | A | 4/1966 | Miles et al. |
| 3,250,444 | A | 5/1966 | Ward |
| 3,361,301 | A | 1/1968 | Philip |
| 3,506,165 | A | 4/1970 | Beard |
| 3,981,419 | A | 9/1976 | Nilson |
| 4,122,845 | A | 10/1978 | Stouffer |
| D267,855 | S * | 2/1983 | French ................... D9/434 |
| 4,433,797 | A | 2/1984 | Galia |
| 4,562,942 | A * | 1/1986 | Diamond ............. B65D 83/62 222/386.5 |
| 4,592,743 | A | 6/1986 | Hjertman et al. |
| 4,694,975 | A | 9/1987 | Hagan |
| 4,877,156 | A * | 10/1989 | Clanet ................. B65D 83/64 222/386.5 |
| 4,892,232 | A | 1/1990 | Martin |
| 4,896,832 | A | 1/1990 | Howlett |
| 4,919,312 | A | 4/1990 | Beard |
| 4,941,598 | A | 7/1990 | Lambelet, Jr. et al. |
| 5,031,802 | A | 7/1991 | Joulia |
| 5,056,690 | A * | 10/1991 | Ichihara ............ B05B 11/00416 222/386 |
| 5,105,995 | A | 4/1992 | Martin |
| 5,199,616 | A | 4/1993 | Martin |
| 5,305,930 | A | 4/1994 | De Laforcade |
| 5,370,313 | A | 12/1994 | Beard |
| 5,429,280 | A | 7/1995 | Bauer et al. |
| 5,441,181 | A * | 8/1995 | Scheindel ............ B65D 83/64 222/386 |
| 5,520,310 | A | 5/1996 | Bauer et al. |
| 5,577,641 | A * | 11/1996 | De Laforcade ..... B29C 45/1676 222/386 |
| 5,624,055 | A | 4/1997 | Clanet |
| 5,875,927 | A | 3/1999 | D'Andrade |
| 5,904,274 | A | 5/1999 | Warby |
| 5,914,085 | A | 6/1999 | Zimmerhackel |
| 6,004,300 | A * | 12/1999 | Butcher ............. A61M 5/31511 604/218 |
| 6,095,182 | A | 8/2000 | Warby |
| 6,260,738 | B1 | 7/2001 | Kerr |
| 6,334,553 | B1 * | 1/2002 | Bouras ................. B05C 11/10 222/386 |
| 6,405,898 | B1 | 6/2002 | O'Connor et al. |
| 6,745,920 | B2 * | 6/2004 | Gupta ................. B65D 83/64 222/387 |
| 7,104,424 | B2 | 9/2006 | Kolanus |
| 7,306,123 | B2 | 12/2007 | Masuda |
| 7,306,124 | B2 | 12/2007 | Masuda |
| 7,665,923 | B2 | 2/2010 | Py et al. |
| 8,006,868 | B2 | 8/2011 | Geiberger et al. |
| 8,387,827 | B2 | 3/2013 | Helf |
| 8,616,417 | B2 | 12/2013 | Neuhaus |
| 8,720,747 | B2 | 5/2014 | Hoagland |
| 8,863,994 | B2 | 10/2014 | Neuhaus et al. |
| 9,211,994 | B2 | 12/2015 | Andersen |
| 9,403,636 | B2 | 8/2016 | Bodet et al. |
| 9,469,468 | B2 | 10/2016 | Shibata |
| 10,022,740 | B2 | 7/2018 | Van Swieten et al. |
| 10,364,093 | B2 | 7/2019 | Bartolucci |
| 10,625,929 | B2 | 4/2020 | Bartolucci |
| 10,625,930 | B2 | 4/2020 | Takahashi |
| 10,850,914 | B2 | 12/2020 | Bartolucci |
| 2002/0162450 | A1 * | 11/2002 | Frost ................. F15B 1/24 92/248 |
| 2005/0103811 | A1 | 5/2005 | Heukamp |
| 2006/0065677 | A1 * | 3/2006 | Py ................. A45D 34/04 222/383.1 |
| 2006/0196889 | A1 | 9/2006 | Masuda |
| 2007/0051754 | A1 | 3/2007 | Strand |
| 2007/0090133 | A1 | 4/2007 | Macleod et al. |
| 2007/0095853 | A1 | 5/2007 | Bonney et al. |
| 2007/0125799 | A1 | 6/2007 | Bonney |
| 2007/0137643 | A1 | 6/2007 | Bonney |
| 2007/0164049 | A1 | 7/2007 | Bonney |
| 2007/0175917 | A1 | 8/2007 | Bonney |
| 2008/0061083 | A1 | 3/2008 | Masuda |
| 2008/0149098 | A1 | 6/2008 | Bonney |
| 2008/0272144 | A1 | 11/2008 | Bonney |
| 2009/0272765 | A1 | 11/2009 | Seki et al. |
| 2010/0308082 | A1 | 12/2010 | Lamble |
| 2011/0011889 | A1 | 1/2011 | Bonney |
| 2012/0006859 | A1 | 1/2012 | Wilkinson |
| 2013/0019802 | A1 | 1/2013 | Leck |
| 2013/0068119 | A1 | 3/2013 | Kennedy |
| 2014/0209633 | A1 | 7/2014 | Mcdaniel |
| 2015/0090736 | A1 | 4/2015 | Erickson et al. |
| 2016/0129197 | A1 * | 5/2016 | Netting ............. A61M 5/31513 604/194 |
| 2017/0182699 | A1 | 6/2017 | Kase |
| 2018/0072485 | A1 | 3/2018 | Fore |
| 2018/0201434 | A1 | 7/2018 | Presche |
| 2018/0273290 | A1 | 9/2018 | Claeys |
| 2019/0071242 | A1 | 3/2019 | Bartolucci |
| 2020/0148458 | A1 | 5/2020 | Bartolucci |
| 2020/0148459 | A1 | 5/2020 | Bartolucci |
| 2020/0316629 | A1 | 10/2020 | Bartolucci |
| 2021/0039876 | A1 | 2/2021 | Bartolucci et al. |

FOREIGN PATENT DOCUMENTS

| | | |
|---|---|---|
| DE | 202016101580 U1 | 8/2017 |
| FR | 1454371 A | 9/1966 |
| FR | 2311593 A1 | 12/1976 |
| FR | 2990421 B1 | 2/2015 |
| GB | 1414637 A | 11/1975 |
| JP | 0220959 U | 2/1990 |
| JP | 0462677 U | 5/1992 |
| JP | 2018058591 A | 4/2018 |
| WO | WO2004045778 A1 | 6/2004 |
| WO | 2017115827 A1 | 7/2017 |

OTHER PUBLICATIONS

All final and non-final office actions for U.S. Appl. No. 16/118,663.
All final and non-final office actions for U.S. Appl. No. 16/184,367.
European Search Report for 17162178.2 dated Aug. 21, 2017.
European Search Report for EP 17175852.7 dated Sep. 19, 2017.
European Search Report for EP 17189053.6 dated Feb. 28, 2018.
European Search Report for EP 17203315.1 dated May 4, 2018.
PCT International Search Report and Written Opinion for PCT/US2018/058653 dated Jan. 25, 2019.
U.S. Appl. No. 16/184,367, filed Nov. 8, 2018, Bartolucci et al.
All final and non-final office actions for U.S. Appl. No. 16/666,879.
U.S. Appl. No. 16/666,879, filed Nov. 1, 2019, Bartolucci et al.
All final and non-final office actions for U.S. Appl. No. 16/907,677.
European Search Report for EP18152909.0 dated Jun. 18, 2018.
PCT International Search Report and Written Opinion for PCT/US2019/012453 dated Apr. 1, 2019.
PCT International Search Report and Written Opinion for PCT/US2019/060172 dated Apr. 23, 2020.
PCT International Search Report and Written Opinion for PCT/US2019/060173 dated Jun. 2, 2020.
U.S. Appl. No. 16/907,677, filed Jun. 22, 2020, Bartolucci et al.
U.S. Appl. No. 17/076,907, filed Oct. 22, 2020, Bartolucci et al.

* cited by examiner

PISTON WITH FLEXIBLE CLOSURE FOR AEROSOL CONTAINER

FIELD OF THE INVENTION

The present invention relates to a piston for an optionally pressurized container, wherein the piston has a sidewall, an upper side and a bottom side, and at least a first circumferential seal, wherein at least the upper side of the piston is closed by a closure, and wherein the upper side is made of a first elastic material, wherein the upper side is configured to deform upon a pressure change acting on the upper side, wherein the sidewall is made of a second material which is different from the first elastic material, wherein the first circumferential seal is positioned on the sidewall on its outer surface. The present invention further relates to an optionally pressurized container comprising
   a. a container body having a wall, which surrounds an interior, wherein the wall has an inner surface facing to the interior;
   b. a first hole disposed in the wall of the container body; wherein the hole optionally has a first valve mounted therein; and
   c. a piston as mentioned above, which divides the interior of the container into two chambers.

The present invention further relates to a process of discharging a product from said container. The present invention further relates to a process of manufacturing a pressurized container, comprising at least these steps:
   a.) providing a container body precursor having a first hole at one end of the container, and an open end; wherein a first valve is optionally mounted into the first hole;
   b.) placing a piston as mentioned above in the container which seals a first chamber in the container body precursor designed to comprise a product;
   c.) closing the open end of the container body precursor with a sealable closure to form the container and to form a second chamber; and
   d.) pressurizing the second chamber with a propellant and sealing the second chamber propellant-tight to form the pressurized container;
   e.) loading a product into the pressurized container.

BACKGROUND OF THE INVENTION

Pistons have been used in aerosol containers for a long time. Current piston aerosol technology utilizes a plastic piston within a sheet metal container, e.g., an aluminum or steel aerosol container. Piston aerosol containers have a propellant below the piston, forming the pressure side, and a product above the piston, forming the product side. Accordingly, the piston divides the interior of the aerosol container into two chambers. The product side of the container can contain a valve. When this valve is operated, the pressure above the piston drops and pushes the piston from the pressure side upwards, and dispenses the product out of the valve.

Current piston aerosol containers are generally made of thin sheet metal, and are often used in the dispensing of viscous products, such as shaving gels and the like. Due to the viscous nature of the product being dispensed via piston aerosols, the pistons have traditionally been designed using rigid plastics that are either slightly undersized or sized to a line to line fit with the inner can wall. These piston designs are successful at dispensing because the viscous product itself is being utilized as a sealing agent, i.e. to form a seal between the piston and the aerosol can inner wall. A disadvantage of this technical solution is that the sidewalls of the cans always retain residual product that was used to form the seal between the can and the piston.

Pressurized aerosol cans made from plastic tend to expand to a certain extend when being pressurized and/or when the piston moves within the can. Moreover, such plastic aerosol cans expose a certain roughness on the inner side of the can which can cause failure of conventional sealing. To overcome the expansion of the can and the non-ideal inner bottle wall surfaces, piston interference can be increased. By increasing interference, however, the piston will become more and more difficult to insert into the can, and piston stiction will increase with increasing interference. This increasing stiction will cause a pulsating spray/dispensing, until the piston stops moving and stops dispensing the aerosol product due to the large force required to overcome the piston stiction.

An objective of the present invention is to at least partially overcome one or more of the disadvantages present in the state of the art. It is a further objective to provide an improved piston and an improved pressurized container comprising said piston.

Another objective of the present invention is to provide a piston which could be used in a pressurized container where most to all product can be dispensed.

Another objective of the invention is to provide a piston where majority of the sealing effect between the piston and the pressurized container is based on the sealing effect of the piston and not the sealing effect of the content.

Another objective of the present invention is to provide a piston which could be used in a pressurized container where little or no product is retained when the container is emptied.

Another objective of the present invention is to provide a piston which can be used with product of essentially any viscosity and essentially any product form, including liquid and viscous products, e.g. foamy and pasty products.

Another objective of the invention is to provide a piston which can be used with pressurized containers, wherein the container is made of plastic.

Another objective of the invention is to provide a piston which maintains a seal with a plastic aerosol container can inner wall throughout the lifetime of the aerosol container.

Another objective of the invention is to provide a piston for a pressurized container, and a pressurized container comprising said piston at an over pressure up to 180 psig (1.24 MPa). Another object of the invention is to provide a piston for and a pressurized container for dispensable products of viscosities in the range from 1 centipoise ($1*10^{-3}$ Pa*s) to 100000 centipoise (100 Pa*s) comprising said piston.

Another object of the invention is to provide a pressurized aerosol container, which can be filled with product.

Another object of the invention is to provide a process for manufacturing a pressurized aerosol container, in which first a pressurized aerosol container is prepared and then a product is filled in the pressurized aerosol container.

Another object of the invention is to provide a fully assembled and pressurized aerosol container which can be filled with product through its dispensing valve.

Another object of the invention is to provide a fully assembled and pressurized aerosol container which can be filled with product, where a dispensing valve is mounted to the aerosol container after filling with product.

Another object of the invention is a process for discharging a product from an aerosol container where most to all product can be dispersed.

SUMMARY OF THE INVENTION

A contribution to at least partially fulfilling at least one of the aforementioned objectives is made by the independent claims. The dependent claims provide preferred embodiments which contribute to at least partially fulfilling at least one of the objectives.

In a first aspect, the present invention relates to a piston for an optionally pressurized container, wherein the piston has a sidewall, an upper side and a bottom side, and at least a first circumferential seal, wherein at least the upper side of the piston is closed by a closure, and wherein the upper side is made of a first elastic material, wherein the upper side is configured to deform upon a pressure change acting on the upper side, wherein the sidewall is made of a second material which is different from the first elastic material, wherein the first circumferential seal is positioned on the sidewall on its outer surface.

In a second aspect, the invention relates to an optionally pressurized container comprising
  a. a container body having a wall, which surrounds an interior,
    wherein the wall has an inner surface facing to the interior;
  b. a first hole disposed in the wall of the container body; wherein the hole optionally has a first valve mounted therein;
  c. a piston as described in the first aspect of the invention, which divides the interior of the container into two chambers.

In a third aspect, the invention relates to a process of discharging a product from an optionally pressurized container as described in the second aspect of the invention.

In a fourth aspect, the invention relates to a process of manufacturing a pressurized container, comprising at least these steps:
  a.) Providing a container body precursor having a first hole at one end of the container, and an open end; a first valve can optionally be mounted in the first hole;
  b.) Placing a piston as described in the first aspect of the invention in the container which seals a first chamber in the container body precursor designed to comprise a product;
  c.) Closing the open end of the container body precursor with a sealable closure to form the container and to form a second chamber;
  d.) Pressurizing the second chamber with a propellant and sealing the second chamber propellant-tight to form the pressurized container;
  e.) Loading a product into the pressurized container.

DETAILED DESCRIPTION OF THE INVENTION

Definitions

Where reference is made to the hardness of a material or an item, the letters following the value indicate the test method used. Letters A and D refer to the shore hardness determined according to ASTM D2240 type A&D scales, wherein A refers to scale A, and D to scale D. Letter R refers to the Rockwell hardness determined according to ASTM E18.

The diameter of an item, e.g. a container or a piston is determined at a cross-section of the item. With respect to a container which may contain a piston, and to such piston, the referenced cross-section is determined perpendicular to the moving direction of the piston.

The first aspect of the present invention is a piston for a optionally pressurized container, wherein the piston has a sidewall, an upper side and a bottom side, and at least a first circumferential seal, wherein at least the upper side of the piston is closed by a closure, and wherein the upper side is made of a first elastic material, wherein the upper side is configured to deform upon a pressure change acting on the upper side, wherein the sidewall is made of a second material which is different from the first elastic material, wherein the first circumferential seal is positioned on the sidewall on its outer surface.

The container can have any shape which is suited host a piston, a dischargeable product and optionally a propellant. Most of the containers have a cylindrical form and a circular cross section. In a variant, the container may have any other shape, or any other cross section, for example it can have a cylindrical shape which is necked in certain parts, e.g. in the top part of the container or where the container is likely to be held. In this event, the shape of a piston to be used with may need adaptation to the shape of the container.

The container surrounds an interior which is configured to host the piston. The container has a top and a bottom side, and a sidewall. A surface of the sidewall of the container faces the interior. This surface is referred-to as the inner surface of the container. The container can have a first hole disposed in the wall of the container body. A first valve can be mounted in the first hole. The first valve is usually positioned on the top side of the container. The first valve can be operated which then opens a fluid connection between the interior of the container and its surroundings. A product can be discharged when the first valve is operated to be opened. In closed position, the first valve seals the product within the container. The bottom side of the container is closed. This could be achieved e.g. by a tight closure, a grommet or by a closure which contains a second valve. Very often, containers of this kind have a grommet or a second valve at the bottom side. That way, they can be pressurized after assembly of the container which is filled with a product to be dispensed.

The terms top side and bottom side of the container are used in the present context solely to refer to opposing ends of the container. These terms are not intended to provide any reference with respect to a preferred or necessary orientation of the container during storage, transport or in operation. In other words a container might be operated, stored and transported top side up or top side down.

The container can be made of any material which appears suitable for the intended use. Preferred containers are suited for being filled, stored, transported and used at a pressure of up to 15 bars ($=1.5*10^6$ Pa), for e.g. with a pressure in the range from 1 to 15 bars ($=1.0*10^5$ to $1.5*10^6$ Pa), or from 1 to 13 bars ($=1.0*10^5$ to $1.3*10^6$ Pa), or from 1 to 10 bars ($=1.0*10^5$ to $1.0*10^6$ Pa).

To meet the above pressure requirements, the container can be made from a polymer selected from polyethylene napthalene (PEN), polyethylene terephthalate (PET), polypropylene (PP), thermoplastic elastomer (TPE), Urethane, Medium Density Polyethylene (MDPE), Acetal (POM), nitrile rubber (Buna), butyl rubber (BR), silicone elastomer.

The piston may have a shape similar to the cross sectional shape of the container to which the piston is intended to fit. A match in the cross sectional form of the piston and the container can enable the fit of both parts. So, the piston often has a cylindrical shape, in particular a circular cross section as has the container. However, when using shaped containers, the shape of the piston can differ from circular cross-section in favor of the cross-sectional shape of the container. The piston comprises a sidewall, an upper side, a bottom side and at least a first circumferential seal. The piston may have a cylindrical or disk-like shape. The upper side of the piston is closed by a closure: The closure can be flat, indented, or raised. If raised, the shape of the closure might correspond to the shape of the top side of the container for which it is designed. By preference, the closure of the piston is flat as such, but will deform when being operated in a pressurized container due to pressure differences which arise between both sides of the piston's closure. The closure of the piston is a barrier to gases and liquids. Accordingly, the closure is a gastight and liquid-tight item. Gas tight in the present context means that only very little amounts of gas can penetrate the closure of the piston over time. The rate of penetration of gas through the closure is so little that a fully mounted, product loaded and pressurized container remains functional in stock at 25° C. for at least six months with regard to operation of the valve to dispense the loaded product from the container.

The side opposing to the piston's upper side is referred-to as the bottom side. The upper and the bottom side of the piston are connected by a sidewall. The sidewall of the piston is an item whose outer surface is configured to extend along the inner side of the container. The closure of the piston and the sidewall of the piston encompasses a volume of the piston. The sidewall can be ring-like in cross sectional view. In a first variant, the sidewall can be integrated. In another variant, the sidewall can have opening which provides a fluid connection between the volume of the piston and the sidewall of the container. The bottom side of the piston can be opened or closed, or semi-closed. Semi-closed refers to a variant of the bottom side in which the bottom side is partially closed but has opening through which a fluid can flow from outside the bottom side of the piston to fill the volume encompassed by the piston. The fluid can either be propellant or product.

The terms upper side and bottom side of the piston are used in the present context solely to name to opposing ends of the piston. These terms are not intended to provide any reference with respect to a preferred or necessary orientation of the piston during storage, transport or operation. In other words a container comprising such piston might be operated upper side up or upper side down. Moreover, these terms are not intended to refer to a preferred or necessary orientation of the piston when being assembled in a container.

In other words, the piston can be positioned in a container in a first configuration with the upper side of the piston facing the top side of the container. Then product could be placed in a first chamber encompassed by the top side of the container, a part of the sidewall of the container and the upper side of the piston, whereas propellant could be placed in a second chamber which is encompassed by the bottom side of the container, another part of the sidewall of the container and the bottom side of the piston. In this case, some propellant could flow into the interior of the piston provided the bottom side is made semi-closed.

In another configuration, the piston can be positioned in a container with the bottom side of the piston facing the top side of the container. Then product could be placed in a first chamber encompassed by the top side of the container, a part of the sidewall of the container and the bottom side of the piston whereas propellant could be placed in a second chamber which is encompassed by the bottom side of the container, another part of the sidewall of the container and the upper side of the piston. In this case, some product could flow into the interior of the piston provided the bottom side is made semi-closed.

The piston has at least a first circumferential seal. Circumferential means that such seal extends on the sidewall of and around the piston. In a preferred variant, the first circumferential seal is positioned on the sidewall in proximity to the upper side of the piston, for example at the edge formed by the upper side and the sidewall of the piston. The seal can be positioned in distance from the edge formed by the upper side and the sidewall of the piston, for example, about a 1, 2, 3, 4 or 5 mm from the edge.

In any way, the first circumferential seal is positioned on the sidewall on its outer surface. That way, the first circumferential seal faces the inner side of a container wall when the piston is assembled into the container. The first circumferential seal is configured to seal the piston and the inner side of the container gas tight. To achieve this, the first circumferential seal favorably is in partial or full contact with the inner side of the container under a load. The load is generated by cross-sectional dimensional fit of the piston and the container, and by the compressibility of the seal forming material.

The upper side of the piston is made by a first elastic material. The first elastic material can be any elastic material which appears to be suited to form the upper side of the piston of the present invention. The first elastic material can have a shore hardness in the range from 30 A to 100 A, for example from 50 A to 90 A, or from 70 A to 85 A. More specifically, the first elastic material can be a thermoplastic elastomer. Some examples of materials suited to form the upper side of the piston are elastomers, thermoplastic elastomer (TPE), thermoplastic olefin (TPO), thermoplastic urethane (TPU), silicone, butyl rubber and nitrile rubber (buna).

The upper side of the piston may be configured to deform upon a pressure change acting on the upper side. Apart from selecting an elastic material to form the upper side of the piston, the thickness of the upper side can be of relevance. The thickness of the upper side of the piston can be in the range from 0.1 to 5.5 mm, for example in the range from 0.25 to 3.0 mm, or in the range from 0.5 to 1.5 mm.

The piston can have a height, which is at least 25% or more compared with the maximum diameter of the piston. For example, the height of the piston can have a value of at least 30, 50, 70, 80, 90, or 100% of the maximum diameter of the piston. Preferably the height of the piston can be in the range from 35 to 65%, or from 45 to 55% of the maximum diameter of the piston. The height of the piston is determined in the direction of the axis of intended movement of the piston. If the piston has a hemispheric or irregular upper side or bottom side, the height of the piston is determined where the sidewall of the piston is parallel and closest to the wall of a container into which the piston is to be assembled.

The sidewall of the piston is made of a second material which is different from the first elastic material which forms the upper side of the piston. The second material can be any material which appears to be suited to form the sidewall of the present invention. The second material can have a hardness in the range of from 50 A to 150 R, for example in the range from 65 A to 100 D, or from 80 A to 70 D. More specifically, the second material can be selected from the group consisting of a metal, an alloy, a material based on or derived from cellulose, a fibrous material, a thermoplastic and an elastomer. Suitable metals are, for example, aluminium, tinplate, steel and the like. Suited alloys are, for example, alloys comprising at least one of the aforementioned metals. The second material can as well be made from a polymer, in particular from a thermoplastic or an elastomer. Selected and suited polymers are: polyethylene (PE), polypropylene (PP), polyethylene terephthalate (PET), polyethylene napthalene (PEN), Urethane, Medium Density Polyethylene (MDPE), Acetal, nitrile rubber (Buna), butyl rubber, silicone, thermoplastic elastomer (TPE), thermoplastic olefins (TPO) and thermoplastic urethanes (TPU). It can be further beneficial to employ a combination of two or more of the aforementioned materials whereby the combination can comprise materials all belonging to the same of aforementioned groups, for example, a blend of thermoplastics or a combination of two metals. Furthermore, a combination of materials of different groups can be particularly suited, for example, a combination of a fibrous material and a thermoplastic. The hardness of the sidewall is usually greater than the hardness of the first circumferential seal. The sidewall can have a hardness in the range of from 50 A Shore to 150 Rockwell, for example a Shore hardness in the range from 65 A to 100 D, or from 80 A to 70 D. The hardness of the sidewall usually equals the hardness of the second material.

The sidewall of the piston can be configured to deform under pressure, for example, a pressure caused by a propellant, which can be present in the interior of the piston and be in fluid and pressure connection with a chamber of the container that hosts the propellant. In another variant, the pressure can be caused by the product, which can be present in the interior of the piston and be in fluid and pressure connection with a chamber of the container that hosts the product. In any such case, the sidewall deforms towards the wall of the container. This can create, fortify or maintain the seal between the wall of the container and the piston. The deformation of the sidewall can be reversible. This means the sidewall could return to its original shape which it had prior to the deformation.

The first circumferential seal of the piston can be made of any material which appears to be suited to form said first circumferential seal. The first circumferential seal can have a shore hardness in the range of from 30 A to 85 D, for example in the range from 50 A to 100 A, or from 70 A to 85 A. More specifically, the first circumferential seal can be a made of a material comprising at least one element selected from the group consisting of an elastomer, a thermoplastic elastomer (TPE), a thermoplastic olefin (TPO), a thermoplastic urethane (TPU), silicone, butyl rubber (butyl), butyl methacrylate (buma) and a urethane-low density polyethylene copolymer (U/LDPE). The first circumferential seal can be also made from combination of two or more thereof.

The piston can comprise further seals which have a hardness as described for the first circumferential seal. In this case, the hardness of the further seal or the further seals can be of the same value as the hardness of the first circumferential seal, but also be of another value in the above mentioned ranges.

The piston can comprise a second and even further circumferential seals which are positioned on the outer surface of the sidewall. There, the second circumferential seal can be positioned in a distance of at least 1/8, 1/4, for example 1/3, 1/2, 1.0, twice and up to five times as much of the maximum diameter of the sidewall from the first circumferential seal. The second and optionally further circumferential seals can be made of any material which appears to be suited. The second, and optionally any further circumferential seal can have a shore hardness in the range of from 30 A to 150 R, for example in the range from 50 A to 100 D, or from 70 A to 70 D. More specifically, the second and optionally any further circumferential seal can be a made from an elastomer. For example, the second circumferential and optionally any further circumferential seal can be made from a polymer selected from the group consisting of elastomer, thermoplastic elastomer (TPE), thermoplastic olefin (TPO), thermoplastic urethane (TPU), silicone, butyl rubber and nitrile rubber (buna), or a combination of two or more thereof. The first and the second circumferential seal can be made of the same or of different materials.

The piston can comprise one or more guiding means instead of or in addition to the second circumferential seal. These guiding means are positioned on the outer surface of the sidewall. These guiding means can be positioned in a distance of at least 1/4, for example 1/3, 1/2, 1.0, twice and up to five times as much of the maximum diameter of the sidewall from the first circumferential seal. The distance of the guiding means from the first circumferential seal is determined as shortest distance between the first circumferential seal and a part of the guiding means which is closest to the first circumferential seal. The guiding means can be made of any material which appears to be suited. The guiding means can have a hardness as described for the second circumferential seal. The guiding means can be a made from an elastomer, for example one of those described for the second circumferential seal. The guiding means and the first circumferential seal can be made of the same or of different materials.

Further, a cover coat can cover at least a part of the sidewall of the piston. Moreover, the cover coat can also form the closure at the upper side of the piston. Further, the cover coat can form the first circumferential seal and optionally the second and any further circumferential seal and/or guiding means. In a preferred mode, the cover coat is a one-piece item which constitutes the closure on the upper side of the piston and the first circumferential seal. Optionally the one-piece item can in addition constitute the second and any further circumferential seal and/or guiding means. So, the cover coat may completely cover the sidewall and the upper side of the piston. The cover coat can be made of any material suited. By preference, the cover coat can have a hardness and be selected from materials as described above for the first circumferential seal.

The piston can be made as a one-piece item. In this variant, the one-piece item can have different sub-regions, wherein a first sub-region constitutes the closure, a second sub-region constitutes the first seal, a third sub-region constitutes the sidewall and a fourth sub-region constitutes the second seal. The one-piece item can be made from a single material, or from a combination of two or more materials. The one-piece item can be manufactured in many ways, for example, by a molding process or using 3D printing technology.

The piston can have a maximum diameter of the seal, which is up to 11% larger than a maximum diameter of the sidewall of the piston. For example, the maximum diameter of the seal can be in the range of from 0 to 11%, or from 2 to 11%, or from 2 to 9%, or from 5 to 9% larger than the maximum diameter of the sidewall of the piston. The maximum diameter of the seal the same as the maximum diameter of the sidewall when the %-value equals "0". At least the first circumferential seal can have said maximum diameter of the seal. The maximum diameter of a planar circular area, e.g. a cross-section of the piston, the piston, a cross-section of a seal, or a maximum diameter of the container is defined to be the longest straight line segment whose endpoints lie on the circular line which delimits the circular area to which the maximum diameter refers.

A propellant can be used to pressurize the container. Any propellant known can be employed which is also considered suitable by a skilled person. Suited propellants may have a boiling point which is lower than the temperature at which the pressurized container is to be operated. Some examples of propellants which are widely employed for standard applications, e.g. between 15 and 40° C. ambient temperature, are air, nitrogen, nitrous oxide, carbon dioxide, haloalkanes such as propane, butane, isobutene, dimethyl ether, methyl ethyl ether, hydrofluoroalkanes, hydrofluoroolefins, and chlorofluorocarbons, or a combination of two or more propellants.

A second aspect of the present invention is a container which comprises
- a. a container body having a wall, which surrounds an interior,
  wherein the wall has an inner surface facing to the interior of the container body;
- b. a first hole disposed in the wall of the container body; optionally having a first valve mounted therein;
- c. a piston as described in the first aspect of the invention, which divides the interior of the container into two chambers.

The at least the first circumferential seal of the piston can be configured and positioned to provide a gas-tight and/or liquid-tight seal between the first circumferential seal and the inner surface of the wall of the container body. The seal is intended to be maintained and working when the container is put under pressure. To achieve this, the maximum diameter of the piston can be in the range from 0.0 to 5%, for example from 0.3 to 3.7%, or from 0.7 to 1.2% larger than the diameter of the inner surface of the container, in particular than the container in un-pressurized state. The seal can be designed and manufactured as described above.

A contact patch can be formed between the inner surface of the container and the first circumferential seal. The contact patch can have a width in the range from 0.0 mm to 5.0 mm, for example from 0.5 to 3.2 mm, and most preferred from 0.1 to 2 mm The piston can further comprise at least one guiding means which is configured and positioned to guide the piston in the optionally pressurized container. The guiding means can prevent a tilting of the piston. In a variant, a second circumferential seal can be positioned on the sidewall of the piston. Such second circumferential seal can also prevent a tilting of the piston. In a third variant, a combination of guiding means and a second circumferential seal can be used. Reference is made to the description related to guiding means of the piston of the first aspect of the invention regarding further embodiments relating to characteristics of the guiding means.

The container can host two chambers which are separated by a piston. The chamber which is in fluid connection with the first hole of the container, and optionally has a first valve mounted therein, comprises the product by preference. Usually, the other chamber of the container comprises the propellant. Any product can be selected which is known and appears suited for storage in and application from the container of the invention. Preferred products can be selected from the group consisting of product requiring 360° dispensing, products with increased viscosity such as shave gels, shampoos, conditioners, sun screens, and facial products.

A third aspect of the invention is a process of discharging a product from a container as described for the second aspect of the invention. Opening of the valve of the container triggers a movement of the piston which movement forces the product to discharge from the container.

A fourth aspect of the invention is a process of manufacturing a pressurized container, comprising at least these steps:
- a.) Providing a container body precursor having a first hole at one end of the container, and an open end; a first valve can optionally be mounted in the first hole; suited container body precursors as well as valves are available in the market. They can be selected with regard to a product to be loaded.
- b.) Placing a piston as described with regard to the first aspect of the invention in the container body precursor which seals a first chamber in the container body precursor designed to comprise a product;
- c.) Closing the open end of the container body precursor with a sealable bottom closure to form a second chamber; the sealable bottom closure is configured to accept pressurizing the second chamber with a fluid. For this purpose, the sealable bottom closure can comprise an opening, such as a second valve or a second hole, through which the fluid is transferred into the second chamber
- d.) Pressurizing the second chamber with a propellant and sealing the second chamber propellant-tight to form the pressurized container. Suited propellants a are mentioned above. Sealing the second chamber is accomplished by closing the opening in a suited manner. For example, a grommet can be plugged into the opening, or a second valve mounted in the opening can be closed;
- e.) Loading a product into the pressurized container via the first hole.

As mentioned above, the first valve can be mounted in the first hole before loading the product. In this event, the pressurized container can be loaded with the product through the first valve. In an alternative, the first valve can be mounted in the first hole after loading the pressurized container with product. In a third alternative the first valve can be pre-assembled in the container body precursor, or be mounted in the first hole after loading a product but before pressurizing the second chamber.

DESCRIPTION OF THE FIGURES

Figure 1:
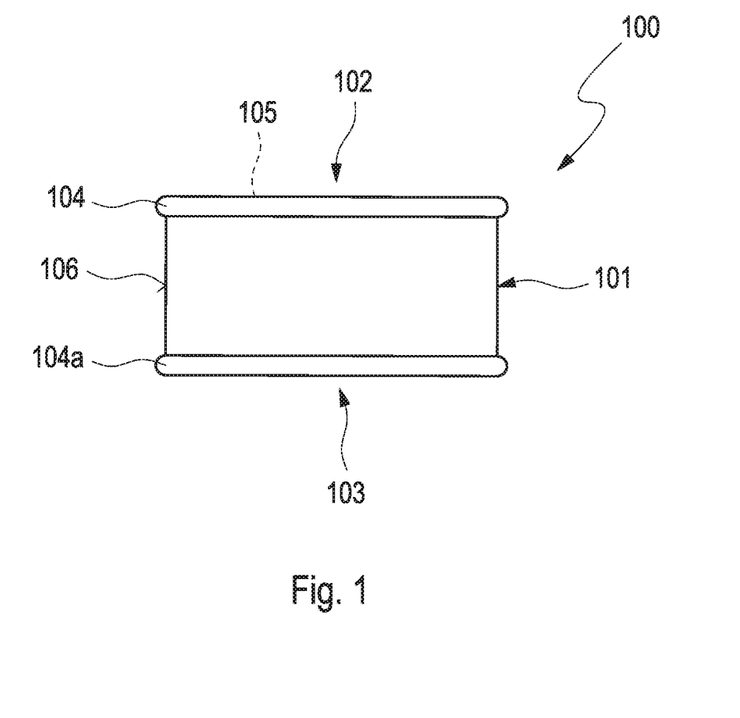
FIG. 1 shows a piston.

FIG. 1 shows a piston 100. Piston 100 has a sidewall 101, an upper side 102 and a bottom side 103, further a first circumferential seal 104, and optionally a second circumferential seal 104a. The upper side of piston 102 is closed by a closure 105. The upper side of the piston 102, including the closure 105 is made of a first elastic material and is designed to deform when a pressure change acts on the upper side 102. The sidewall 101 is made of a second material, which is different from the first elastic material. The first circumferential seal is positioned on the outer surface 106 of the sidewall 101.

Figure 2:
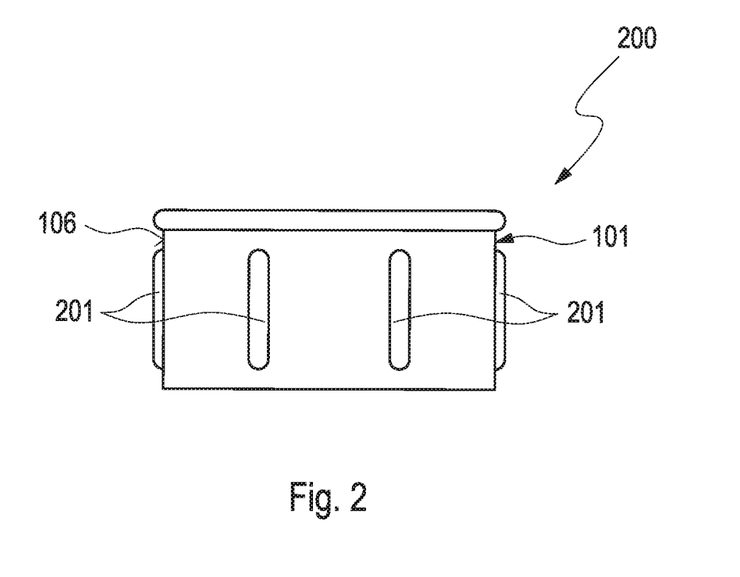
FIG. 2 shows a variant of a piston.

FIG. 2 shows a variant of a piston 200. In this variant, the piston 200 is composed as in FIG. 1, but has guiding means 201 instead of or in addition to (not shown here) a second circumferential seal. The guiding means 201 are positioned on the outer surface 106 of the sidewall 101. The can be oriented in moving direction of piston 200. Usually, they do not extend over the whole outer surface of sidewall 101.

Figure 3:
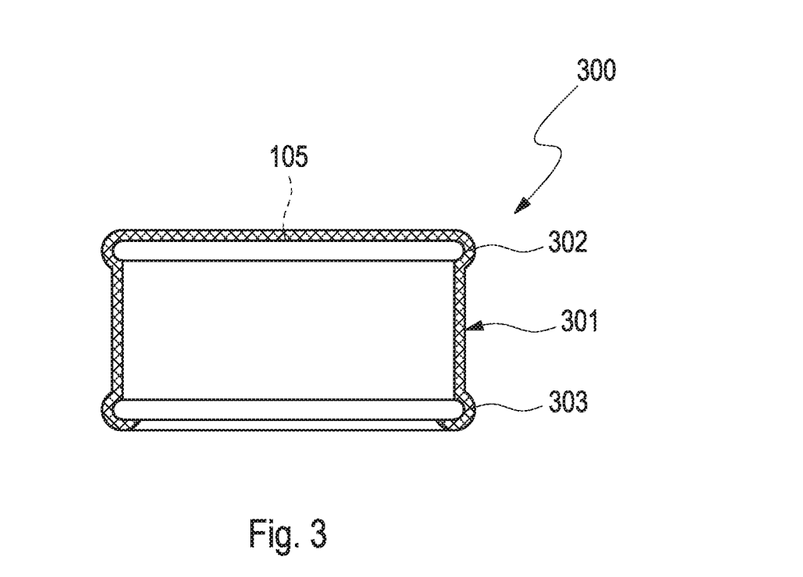
FIG. 3 shows another variant of a piston.

FIG. 3 shows another variant of a piston 300. This piston 300 has a cover coat 301 which forms the upper side closure 105 and two circumferential seals 302, 303. The circumferential seals 302, 303 are positioned on the outer surface of sidewall 101.

Figure 4:
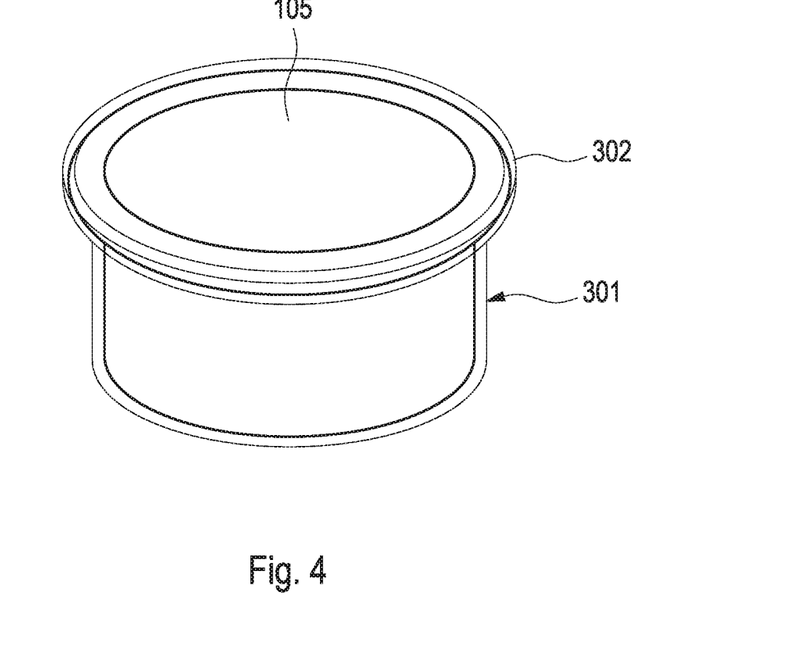
FIG. 4 shows another variant of a piston.

FIG. 4 shows another variant of a piston 400. This piston 400 has a cover coat 301 which forms the upper side closure 105 and one circumferential seal 302. The circumferential seal 302 is positioned on the outer surface of sidewall 101.

Figure 5:
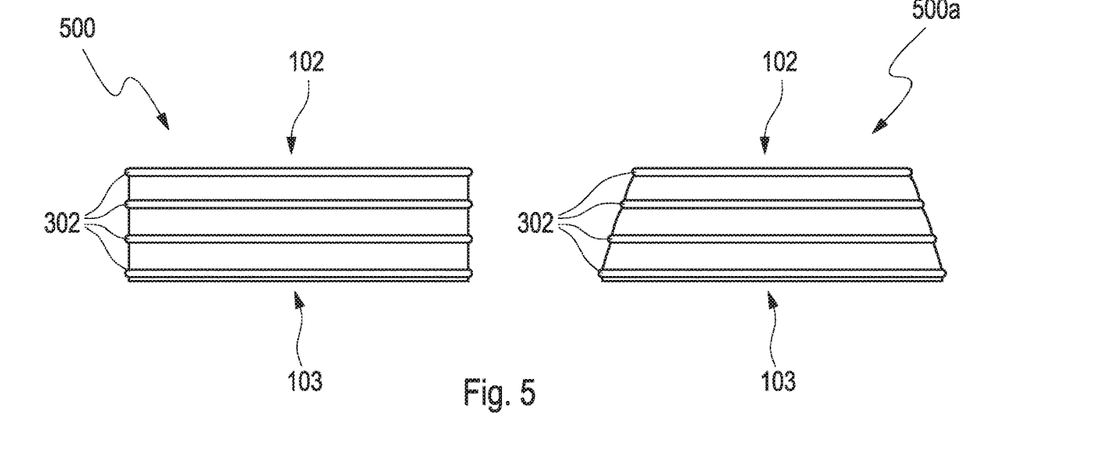
FIG. 5 shows a piston a. at 0 psig (0 kPa); and b. deformed at a pressure of 140 psig (9.65 kPa).

FIG. 5 shows the shape of a. a piston 500 at 0 psig (0 kPa, CT-Scan); and b. a piston 500a deformed at a pressure of 140 psig (9.65 kPa, calculated). The plastic container bottle is not shown in the Figure. Both pistons have an upper side 102 which is not deformed in a relevant way and four circumferential seals 104 on the sidewall of piston 500 and 500a respectively. It can be clearly observed that piston 500 is disc-shaped, in other words an area delimited by the bottom side 103 is essential same size like an area delimited by the upper side 102. Deformed piston 500a has a conical shape, wherein an area delimited by the bottom side 103 is larger than an area delimited by the upper side 102.

Figure 6:
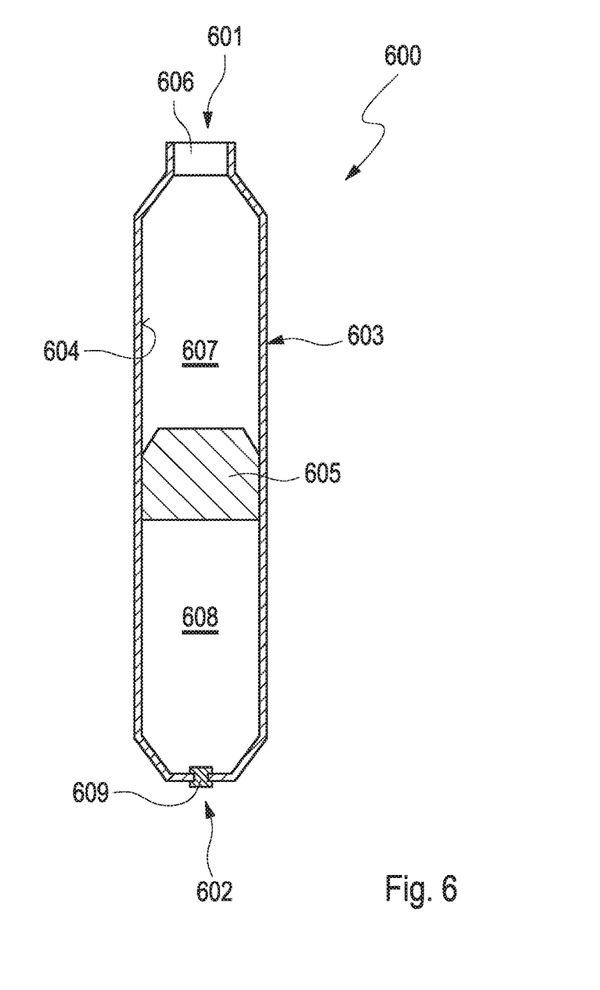
FIG. 6 shows an aerosol container

FIG. 6 shows an aerosol container 600 with an upper side 601, a bottom side 602 and a wall 603 which has an inner surface 604 facing to the interior of the container, and a piston 605. The container further has a hole 606. The piston 605 divides the container 600 into a first chamber 607 and a second chamber 608. The container also has a bottom closure 609.

Figure 7:
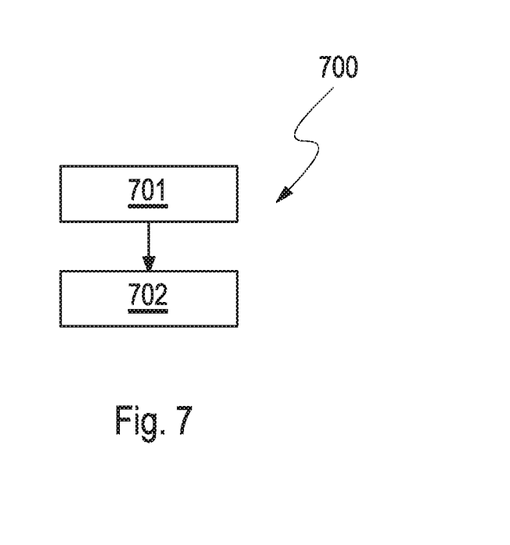
FIG. 7 shows a process of discharging a product from a pressurized container.

FIG. 7 shows a process 700 of discharging a product from a pressurized container. First a pressurized container comprising a product is provided 701 which is then discharged 702 from the container, e.g. by actuating a dispensing valve.

Figure 8:
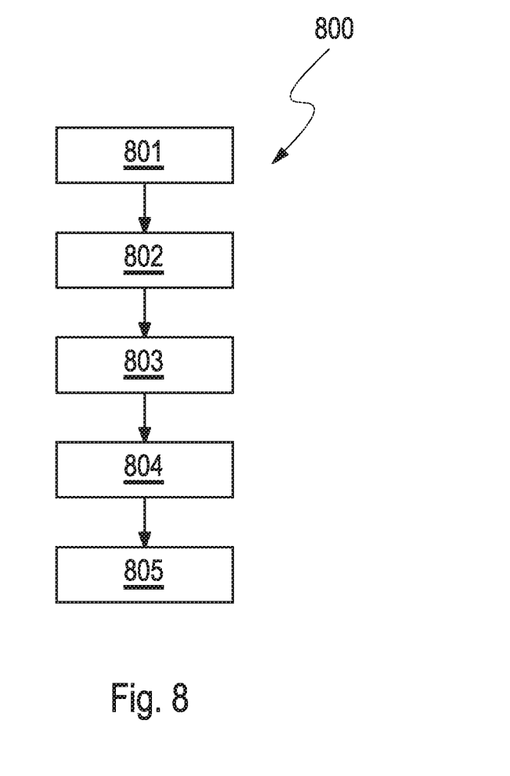
FIG. 8 shows a process of manufacturing a pressurized container.

FIG. 8 shows a process 800 of manufacturing a pressurized container comprising these steps:

801: Providing a container body precursor having a first hole at one end of the container, and an open end;

802: Placing a piston in the container body precursor. The piston seals a first chamber in the container body precursor which is designed to comprise a the loaded product;

803: Closing the open end of the container body precursor with a seal-able bottom closure to form a second chamber;

804: Pressurizing the second chamber with a propellant and sealing the second chamber propellant-tight to form the pressurized container; and

805: Loading a product into the pressurized container.

LIST OF REFERENCE NUMBERS IN FIGURES

100, 200, 300, Piston
400, 500
101 Sidewall
102 Upper side of piston
103 Bottom side of piston
104 First circumferential seal
104a Second circumferential seal
105 closure
106 Outer surface of 101
201 Guiding means
301 Cover coat
302, 303 circumferential seal
500a Deformed piston
600 Container
601 Upper side of container
602 Bottom side of container
603 Container wall
604 Inner surface of 603
605 Piston
606 Hole
607 First chamber
608 second chamber
609 Bottom closure
700 Process
701 Step i.
702 Step ii.
800 Process
801 Step a.)
802 Step b.)
803 Step c.)
804 Step d.)
805 Step e.)

The invention is further illustrated by the following clauses. The following clauses serve to illustrate the possibilities of combining different features of the invention in order to arrive at an embodiment according to the invention.

CLAUSES

1. A piston for a container,
wherein the piston has a sidewall, an upper side and a bottom side, and at least a first circumferential seal,
wherein at least the upper side of the piston is closed by a closure, and
wherein the upper side is made of a first, elastic material,
wherein the upper side is configured to deform upon a pressure change acting on the upper side,
wherein the sidewall is made of a second material which is different from the first elastic material,
wherein the first circumferential seal is positioned on the sidewall on its outer surface.

2. The piston of embodiment 1, wherein at least one of the following applies:
a. the sidewall has a hardness in the range from 50 A Shore to 150 Rockwell;
b. the first circumferential seal has a Shore hardness in the range from 30 A to 85 D.

3. The piston of any one of the preceding embodiments, wherein the piston has a maximum seal diameter, which is from 0 to 11% larger than a maximum diameter of the sidewall.

4. The piston of any one of the preceding embodiments, wherein the sidewall of the piston is configured to deform under pressure.

5. The piston of any one of the preceding embodiments, wherein the first circumferential seal is positioned on the sidewall in proximity to the upper side of the piston.

6. The piston of any one of the preceding embodiments, wherein a second circumferential seal or a guiding means is positioned on the outer surface of the sidewall in a distance of at least ⅛ of the maximum diameter of the sidewall from the first circumferential seal.

7. The piston of embodiment 5 or embodiment 6, wherein the second circumferential seal or the guiding means has a hardness in the range from 30 A to 150 Rockwell.

8. The piston of any one of the preceding embodiments, wherein the piston has a height, which is in the range from 25% or more than the maximum diameter of the piston, wherein the height is determined in the direction of the axis of movement of the piston.

9. The piston of any one of the preceding embodiments, wherein the second material comprises at least one element selected from the group consisting of a metal, an alloy, a material based on or derived from cellulose, a fibrous material, a thermoplastic and an elastomer.

10. The piston of any one of the preceding embodiments, wherein the first circumferential seal is made of a material comprising at least one element selected from the group consisting of an elastomer, a thermoplastic elastomer (TPE), a thermoplastic olefin (TPO), a thermoplastic urethane (TPU), silicone, butyl rubber (butyl), butyl methacrylate (buma) and a urethane-low density polyethylene copolymer (ULDPE).

11. The piston of any one of the preceding embodiments, wherein the sidewall is at least partially covered by a cover coat, which forms the upper side closure and at least the first circumferential seal.

12. The piston of embodiment 11, wherein the cover coat is made of a material comprising at least one element selected from the group consisting of an elastomer, a thermoplastic elastomer (TPE), a thermoplastic olefin (TPO), a thermoplastic urethane (TPU), silicone, butyl rubber (butyl), butyl methacrylate (buma).

13. A container comprising
a. a container body having a wall, which surrounds an interior,
wherein the wall has an inner surface facing to the interior;
b. a first hole disposed in the wall of the container body;
c. a piston as in any one of embodiments 1 to 18, which divides the interior of the container into two chambers.

14. The container of embodiment 13, wherein at least the first circumferential seal of the piston is configured and positioned to provide a gas-tight seal between the first circumferential seal and the inner surface of the wall.

15. The container of any one of embodiments 13 or 14, wherein the maximum diameter of the piston is in the range from 0.0 to 5% larger than the diameter of the inner surface of the container.

16. The container of any one of embodiments 13 to 15, wherein a contact patch is formed between the inner surface and the first circumferential seal, wherein the contact patch has a width in the range from 1 mm to 5.1 mm 17. The container of any one of embodiments 13 to 16, wherein the piston further comprises at least one guiding means which is configured and positioned to guide the piston in the container to prevent tilting of the piston.

18. The container of any one of embodiments 13 to 17, wherein the container is configured to retain a pressure of up to 15 bar.

19. The container of any one of embodiments 13 to 18, wherein the container is made from a material comprising at least one element of the group consisting of a metal, an alloy and a polymer.

20. The container of any one of embodiments 13 to 19, wherein a first valve is mounted in the first hole of the container.

21. The container of embodiments 13 to 20, wherein the chamber having the first hole comprises the product.

22. The container of any one of embodiments 13 to 21, wherein a product selected from the group consisting of any products requiring 360° dispensing, products with increased viscosity such as shave gels, shampoos, conditioners, sun screens, and facial products is comprised in the interior.

23. The container of any one of embodiments 13 to 22, wherein the container comprises a propellant.

24. A process of discharging a product from a container as described in any one of embodiments 13 to 23.

25. The process of embodiment 24, wherein opening of the first valve triggers a movement of the piston, the movement forcing the product to discharge from the container.

26. A process of manufacturing a pressurized container, comprising at least these steps:
a.) Providing a container body precursor having a first hole at one end of the container, and an open end;
b.) Placing a piston as in any one of embodiments 1 to 12 in the container body precursor which seals a first chamber in the container body precursor designed to comprise a product;
c.) Closing the open end of the container body precursor with a sealable bottom do-sure to form a second chamber;
d.) Pressurizing the second chamber with a propellant and sealing the second chamber propellant-tight to form the pressurized container;
e.) Loading a product into the pressurized container.

27. The process of embodiment 26, wherein step e.) is followed by:
f.) a valve is mounted in the first hole.

28. The process of embodiment 26, wherein the first hole in step a.) has a valve mounted therein.

EXAMPLES

The invention is further illustrated in the following by way of examples. The invention is not limited to or by the examples in any way.

If not stated different, standard cylindrical aerosol bottles were used to assess the design of the pistons. The initial diameter of the bottle (before pressurizing with a propellant) was 2.040" (5.18 cm). Such bottle expands up to 0.031" (0.079 cm) in diameter when being pressurized at 140 psig (965 kPa).

All pistons were either printed on a 3D printer Lulzbot Taz-5 with a FlexyDually Printhead or overmoulded via hand injection into a silicone soft tool containing a cut to length polypropylene tubing. The piston prepared in the examples are characterized in the table below. Each piston had a ring-like sidewall, which was closed on one side referred-to as the upper side. At the edge of the sidewall and the upper side of the piston, a $1^{st}$ seal was positioned on the outer side of the sidewall, which could face to and get in contact with an aerosol bottle. The seal had a shape as mentioned and covered a ring like area on the sidewall which ring like area had a width as specified. When a pressure difference was acting on the closure, the closure bend elastically, so that the center of the closure was displaced. The pistons had a second being positioned in a specified distance from the $1^{st}$ seal on the sidewall. Piston 3 had guiding means on the sidewall instead of a $2^{nd}$ seal. Parameters describing these guiding means are mentioned in the remarks.

| Property | Piston no. 1 |
|---|---|
| Type of piston | One-piece |
| Way of manufacture of piston | 3D print |
| Material sidewall | PP |
| Max diameter sidewall | 1" (4.70 cm) |
| Height of sidewall | 1" (2.54 cm) |
| Hardness of sidewall | 90D |
| Thickness of sidewall | 0.40" (0.1 cm) |
| Material $1^{st}$ seal | PP |
| Max diameter $1^{st}$ seal/piston | 2.055" (5.22 cm) |
| Max height of $1^{st}$ seal on sidewall | 0.1" (0.25 cm) |
| Shape $1^{st}$ seal | Hemispherical |
| Width of ring like area of $1^{st}$ seal on sidewall | 0.2" (0.5 cm) |
| Position of $1^{st}$ seal on sidewall | at the edge to the closure |
| Hardness of $1^{st}$ seal | 75 A |
| Max diameter $2^{nd}$ seal | Like $1^{st}$ seal |

-continued

| | |
|---|---|
| Shape 2nd seal | Like 1st seal |
| Width of 2nd seal on sidewall | Like 1st seal |
| Position of 2nd seal on sidewall | 1" (2.54 cm) from 1st seal |
| Material of closure | PP |
| Thickness of closure | 1 mm |
| Hardness of closure | 85A |
| Max displacement of center of closure due to pressure difference acting thereon | 1.5" @ 120 psig (3.8 cm @ 827 kPa) |
| Inner diameter of aerosol container | 2.040" (5.18 cm) |
| Material of aerosol container | PET |
| Max expansion of diameter of aerosol container when pressurized at 140 psig (965 kPa) | 0.031" (0.079 cm) |
| Amount of oversize of piston diameter to aerosol container inner diameter | 0.01" (0.025 mm) |
| Remarks | Piston shape see FIG. 2 | n.a. = not applicable;
PP = polypropylene;
PET = Polyethyleneterephthalate.

Tests

Pistons were tested in a 2.040" (5.18 cm) diameter Air-O-Pack aerosol bottle (available from Airolux, AG, 8865 Bilten, Switzerland). The bottle was filled with water as sample product and pressurized with air.

a. Seal

The table below summarizes which piston diameters were successfully insert into the aerosol bottle and whether leakage was observed. Leakage was observed when gas below the piston was observed bubbling above the piston.

| Piston no. 1 | | | | |
|---|---|---|---|---|
| Aerosol bottle inner diameter (inch) | Maximum seal diameter at piston (inch) | Piston diameter oversize to aerosol container inner diameter | Insert into aerosol bottle | Leakage when pressurized with air at 30-120 psig (206-827 kPa) |
| 2.040 | 2.045 | 0.25% | Yes | Yes |
| 2.040 | 2.05 | 0.49% | Yes | Yes |
| 2.040 | 2.055 | 0.74% | Yes | No |
| 2.040 | 2.060 | 0.98% | Yes | No |
| 2.040 | 2.065 | 1.23% | No | No |
| 2.040 | 2.075 | 1.72% | No | No |

Observation: An interference of the piston's diameter with the inner diameter of the container in the range from 0.015 to 0.025 inch is advantageous. The piston can be inserted into the container and a tight seal is formed between the piston and the inner surface of the container.

b. Residual product in disposable aerosol container

The above mentioned aerosol container with piston no. 1 was operated until the piston has advanced to the top side of the container close to the valve. The container was then x-rayed to determine the shape of the piston's closure and identify amounts of residual product in the aerosol container.

Observation: Little residual product remained in an aerosol container with piston no. 1.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A piston for a container,
   wherein the piston has a sidewall, an upper side and a bottom side, and at least a first circumferential seal,
   wherein at least the upper side of the piston is closed by a closure wherein the closure is flat or indented which will deform when being operated in a pressurized container, and
   wherein the upper side is made of a first, elastic material,
   wherein the upper side is configured to deform upon a pressure change acting on the upper side,
   wherein the sidewall is made of a second material which is different from the first elastic material,
   wherein the first circumferential seal is positioned on the sidewall on its outer surface wherein at least one of the following applies:
   a. the sidewall has a hardness in the range from 50 A Shore to 150 Rockwell;
   b. the first circumferential seal has a Shore hardness in the range from 30 A to 85 D and
   wherein a second circumferential seal or a guiding means is positioned on the outer surface of the sidewall in a distance of at least ⅛ of a maximum diameter of the sidewall from the first circumferential seal.

2. The piston of claim 1, wherein the piston has at least one of these features:
   i) the piston has a maximum seal diameter, which is from about 0 to about 11% larger than a maximum diameter of the sidewall;
   ii) the sidewall of the piston is configured to deform under pressure;
   iii) the first circumferential seal is positioned on the sidewall in proximity to the upper side of the piston;
   iv) the piston has a height, which is in the range from about 25% or more than the maximum diameter of the piston, wherein the height is determined in the direction of the axis of movement of the piston;
   v) the second material comprises at least one element selected from the group consisting of a metal, an alloy, a material based on or derived from cellulose, a fibrous material, a thermoplastic and an elastomer; and
   vi) the first circumferential seal is made of a material comprising at least one element selected from the group consisting of an elastomer, a thermoplastic elastomer (TPE), a thermoplastic olefin (TPO), a thermoplastic urethane (TPU), silicone, butyl rubber (butyl), butyl methacrylate (buma) and a urethane-low density polyethylene copolymer (ULDPE).

3. The piston of claim 1, wherein the second circumferential seal or the guiding means has a hardness in the range from 30 A to 150 Rockwell.

4. The piston of claim 1, wherein the sidewall is at least partially covered by a cover coat, which forms the upper side closure and at least the first circumferential seal.

5. The piston of claim 4, wherein the cover coat is made of a material comprising at least one element selected from the group consisting of an elastomer, a thermoplastic elastomer (TPE), a thermoplastic olefin (TPO), a thermoplastic urethane (TPU), silicone, butyl rubber (butyl), butyl methacrylate (buma).

6. A container comprising
  a. a container body having a wall, which surrounds an interior,
    wherein the wall has an inner surface facing to the interior;
  b. a first hole disposed in the wall of the container body;
  c. a piston as in claim 1, which divides the interior of the container into two chambers.

7. The container of claim 6, wherein at least the first circumferential seal of the piston is configured and positioned to provide a gas-tight seal between the first circumferential seal and the inner surface of the wall.

8. The container of claim 6, wherein the maximum diameter of the piston is in the range from about 0.0 to about 5% larger than the diameter of the inner surface of the container.

9. The container of claim 6, wherein the container whereby at least one of these features:
  I) a contact patch is formed between the inner surface and the first circumferential seal, wherein the contact patch has a width in the range from 1 mm to 5.1 mm;
  II) the piston further comprises at least one guiding means which is configured and positioned to guide the piston in the container to prevent tilting of the piston;
  III) the container is configured to retain a pressure of up to 15 bar;
  IV) the container is made from a material comprising at least one element of the group consisting of a metal, an alloy and a polymer;
  V) a first valve is mounted in the first hole of the container;
  VI) the chamber having the first hole comprises the product;
  VII) a product selected from the group consisting of any products requiring 360° dispensing, products with increased viscosity such as shave gels, shampoos, conditioners, sun screens, and facial products is comprised in the interior; and
  VIII) the container comprises a propellant.

10. A process comprises a step of discharging a product from a container as claimed in claim 6.

11. The process of claim 10, wherein opening of a first valve triggers a movement of the piston, the movement forcing the product to discharge from the container.

12. A process of manufacturing a pressurized container, comprising at least these steps:
  a.) Providing a container body precursor having a first hole at one end of the container, and an open end;
  b.) Placing a piston as in claim 1 in the container body precursor which seals a first chamber in the container body precursor designed to comprise a product;
  c.) Closing the open end of the container body precursor with a sealable bottom closure to form a second chamber;
  d.) Pressurizing the second chamber with a propellant and sealing the second chamber propellant-tight to form the pressurized container;
  e.) Loading a product into the pressurized container.

13. The process of claim 12, wherein step e.) is followed by:
  f.) Mounting a valve in the first hole.

14. The process of claim 12, wherein the first hole in step a.) has a valve mounted therein.

* * * * *